United States Patent [19]

Mergl

[11] 4,266,653
[45] May 12, 1981

[54] STOPPERING MACHINE

[75] Inventor: Vernon F. Mergl, Timonium, Md.

[73] Assignee: National Instrument Company, Inc., Baltimore, Md.

[21] Appl. No.: 911,312

[22] Filed: Jun. 1, 1978

[51] Int. Cl.³ .................... B65G 47/24; B65G 29/02
[52] U.S. Cl. .................................. 198/392; 198/396; 221/160; 221/167
[58] Field of Search .................. 53/319; 198/392, 396, 198/397; 221/160, 159, 167

[56] References Cited

U.S. PATENT DOCUMENTS

| | | | |
|---|---|---|---|
| 1,606,432 | 12/1924 | Herkenhine | 198/392 X |
| 2,710,714 | 6/1955 | Worth | 53/319 X |
| 3,168,949 | 2/1965 | Aidlin | 198/392 |
| 3,269,514 | 5/1964 | Daniels et al. | 198/396 X |
| 3,272,310 | 9/1966 | Blickisdorf et al. | 198/392 |
| 3,300,022 | 1/1967 | Sterling | 198/392 X |
| 3,330,403 | 7/1967 | Roberts et al. | 198/392 |
| 3,706,368 | 12/1972 | Sterling | 198/392 |
| 3,881,596 | 5/1975 | Miller | 198/392 X |
| 4,138,009 | 2/1979 | Strong | 198/396 |

Primary Examiner—Horace M. Culver
Attorney, Agent, or Firm—Craig and Antonelli

[57] ABSTRACT

A stoppering machine is disclosed which includes an inclined rotatable member which contacts a supply of stoppers for selectively arranging and feeding the stoppers to a stopper inserting device where they are inserted into the openings of successively presented containers such as bottles. An arrangement is also disclosed wherein the stoppers are guided to and supported at a position immediately over the openings of the successively presented containers for insertion into the openings of said containers by the inserting device. Further, an arrangement is disclosed for blocking the movement of the stoppers being guided to the aforementioned position when the inserting device inserts the stoppers into the openings of the successively supplied containers.

9 Claims, 22 Drawing Figures

STOPPERING MACHINE

BACKGROUND AND SUMMARY OF THE INVENTION

The present invention relates to stoppering machines for applying stoppers to the openings of containers such as bottles. More particularly, the present invention is directed to an improved stoppering machine wherein a device is provided for holding a supply of stoppers and for selectively arranging and feeding the stoppers to a stopper insert means where the stoppers are inserted into the openings of containers. The invention is also directed to an improved stoppering machine wherein a device is provided for guiding the stoppers to and supporting the stoppers at a position immediately over the openings in containers for insertion into said openings by a stopper insert means.

The aforementioned and other features of the present invention will be made clear in the following specification.

Stoppering machines for applying stoppers, made of a resilient material such as rubber, for example, to the openings in containers such as bottles are known in the art. Such machines have application in the pharmaceutical industry, the cosmetics industry, etc.

Figures 1, 2A, 2B, 6:
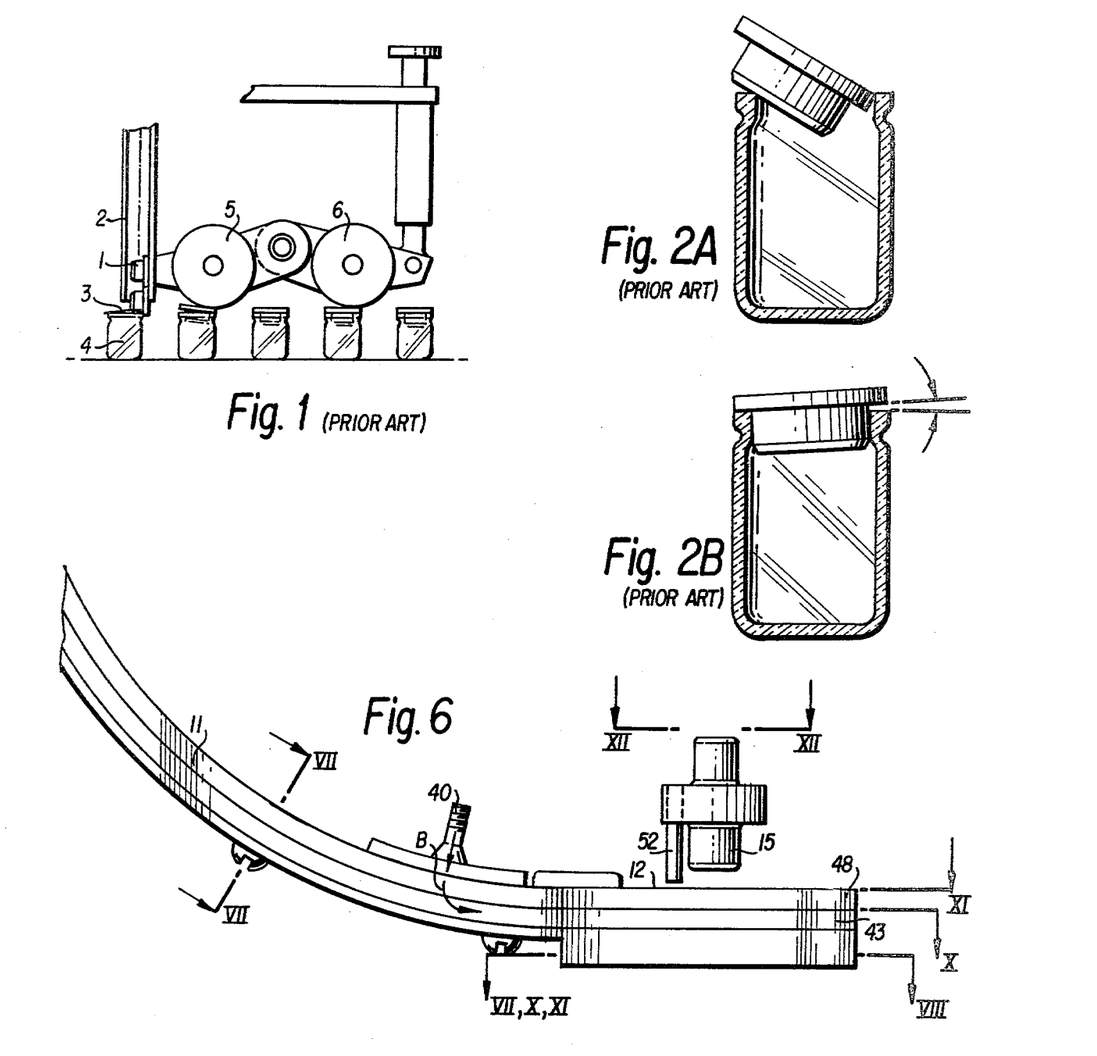
FIG. 1 is a schematic side view of a stoppering machine according to the prior art.
FIG. 2a is a cross sectional view of a stopper which has become cocked or misaligned with respect to the container opening in a stoppering machine of the type shown in FIG. 1.
FIG. 2b is a cross sectional view of a stopper which is canted in the opening of a container after passing under the rollers of a stoppering machine of the type shown IN FIG. 1.
FIG. 6 is a front view of a portion of the stoppering machine of FIG. 3 illustrating the stopper chute, the stopper insert station and the vertically moveable ram.

One such prior art machine is illustrated in FIG. 1 of the drawings where it is seen that properly oriented stoppers 1 are fed sideways vertically down a delivery chute 2 to a pick-off plate 3. This plate holds the stoppers for the oncoming containers 4 whose lips pick off the stoppers from the pick-off plate. Two power-driven rollers 5 and 6 then roll the stoppers into the openings of the containers. This type of machine suffers from several disadvantages in that since a stopper is rotated into position on a container by the interaction of the container lip and the side of the stopper, the stopper can become cocked or misaligned as shown in FIG. 2a. In addition, because a rolling force is used to force a stopper into an opening of a container, the stopper may be canted even after passing under the second roller as shown in FIG. 2a. Also, the use of a plurality of rollers in an attempt to insure against such canting adds additional time and expense to the stoppering operation itself.

Another stoppering machine which avoids the drawbacks and disadvantages of the aforementioned type of prior art stoppering machine is disclosed by Henderson et al in U.S. Pat. No. 2,934,238. In this apparatus, the stoppers are brought in a right-side-up orientation to a position above the containers to be stoppered where a vertically reciprocating ram is employed to force the stoppers into the openings of the containers. However, several disadvantages inhere in the Henderson et al stoppering apparatus. In the first instance, the stoppers are not supported immediately over the openings of the containers before being inserted therein by the ram but are spaced above the openings from where they must be forced through a cylindrically shaped passageway toward the containers. The passageway is open or slotted along one side over a considerable portion of its length. The stoppers are moved into this passageway sideways through this opening or slot. The size of the cylindrically shaped passageway is smaller than the corresponding size of the stoppers so that the stoppers must be compressed and forced through the passageway, except in the area of the opening or slot where expansion can occur. Thus, the generation of undesirable particulate matter from the abrasion of the stoppers by the passageway may occur. This is particularly so in the area of the bottom edge of the slot or opening along one side of the passageway since the slot does not extend the full length of the passageway and any portion of the resilient stopper having expanded into this opening would tend to be sheared off when forced over this bottom edge.

The generation of particulate matter is especially deleterious where contamination of the container being stoppered must be guarded against as in the pharmaceutical and cosmetics industries.

The likelihood of contamination by the generation of particulate material is further increased in the Henderson et al stoppering machine because with the insertion of a stopper into an opening of a container, the next stopper to be inserted is supported in a chute in such a manner that it is forced into contact with the side of the ram during its movement.

Thus, an object of the present invention is to provide a stoppering machine wherein the aforementioned disadvantages of the prior art stoppering machines are avoided and, more particularly, wherein stoppers can be quickly and safely inserted into the openings of containers without undue fear of contamination by particulate matter generated during insertion of the stoppers.

This and other objects of the present invention are achieved according to the present invention by providing a stoppering machine comprising, in combination, a stopper support means for supporting stoppers immediately over the openings of successively presented containers, said stopper support means having a through hole whose shape corresponds to that of said stoppers and whose side wall tapers inwardly such that said stoppers are supported by said tapered side wall in a position immediately over the openings of said successively supplied containers for insertion into said openings, and a guide means for guiding stoppers to a position above said through hole of said stopper support means where said stoppers drop and enter said through hole and are supported by the tapered side walls of said through hole.

According to a preferred embodiment illustrated herein, the aforementioned stopper support means is provided with an upper surface portion on which the stoppers are supported as they are guided by the guide means to a position above the through hole.

The depth of the through hole in the support means can be made considerably smaller than the length of the stoppers supported therein so that the stoppers can be quickly and easily inserted into the openings in the successively supplied containers without fear of undue contamination from generated particulate matter.

According to another feature of the present invention, a blocking means such as a pin can be provided for blocking the movement of stoppers being guided by the guiding means when an inserting means moves down into the through hole of the supporting means. With such a blocking means, the stoppers are not forceably pressed against the side of the moving inserting means.

An additional object of the present invention is to provide a means for holding a supply of stoppers and for selectively arranging and feeding the stoppers to the stopper insert means of a stoppering machine, said means for holding, selectively arranging and feeding stoppers having a minimum number of moving parts and being capable of selectively arranging and feeding stoppers at preselected rates as high as 500 per minute or more.

The aforementioned and other objects of the present invention are attained by providing an inclined rotatable member which contacts a supply of stoppers, said rotatable member having supporting means thereon for supporting stoppers during rotation of the inclined member such that stoppers are raised to where those stoppers not properly arranged in said supporting means for feeding to the stopper inserting means of the stoppering machine fall from said supporting means under the effect of gravity.

In a disclosed embodiment of the invention, the supporting means of the inclined rotatable member includes an annular recess for supporting the stoppers. Means can also be provided which protrudes into the annular recess and which rotates with the inclined rotatable member to ensure that the stoppers supported in the annular recess are raised as the inclined rotatable member rotates.

Further, according to a disclosed embodiment, a guiding means is provided which projects into the annular recess of the inclined rotatable member so as to guide stoppers therein to a chute through which said stoppers move by the force of gravity to the stopper inserting means of the stoppering machine, said guiding means being positioned downstream along the path of rotation of the inclined rotatable member from where those stoppers not properly arranged in the annular recess fall from said annular recess under the effect of gravity.

While the aforementioned invention for holding a supply of articles and for selectively arranging and feeding the same is described in the specific context of a stoppering machine, it is to be understood that this invention could be used to hold a supply of articles other than stoppers and to selectively arrange and feed the same.

BRIEF DESCRIPTION OF THE DRAWINGS

The above and other objects, features and advantages of the present invention will become more apparent from the following description when taken in connection with the accompanying drawings which show, for purposes of illustration only, one embodiment in accordance with the present invention, and wherein.

DETAILED DESCRIPTION OF THE DRAWINGS

Referring now to the drawings, wherein like reference numerals are used to designate like parts throughout, it is noted that FIGS. 1, 2a and 2b have been previously discussed.

Figure 3:
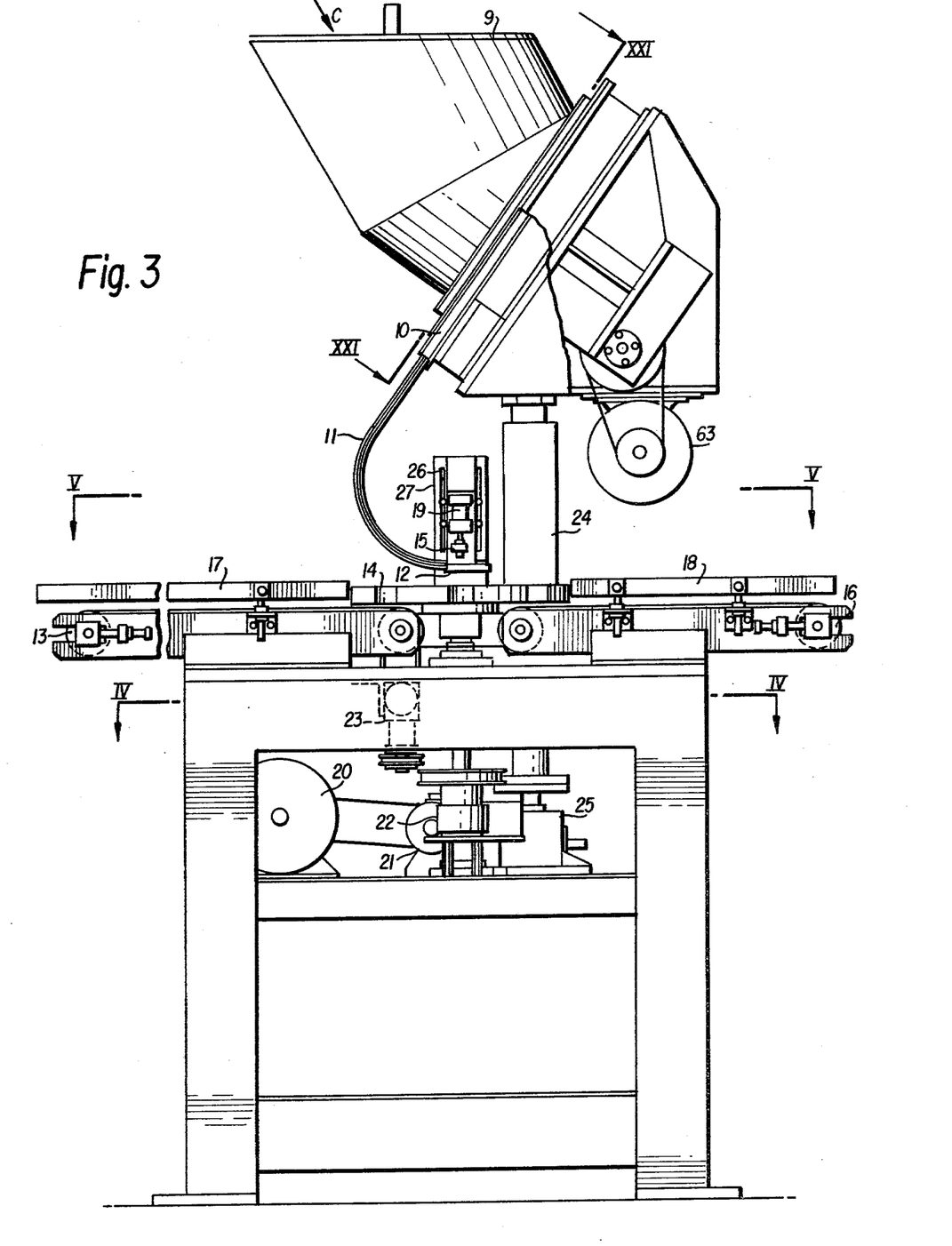
FIG. 3 is a front elevation view of a stoppering machine according to the present invention.

FIG. 3 illustrates a stoppering machine according to a preferred embodiment of the present invention wherein a hopper 8 with a cover 9 is provided for holding a supply of stoppers. Selectively arranged stoppers are fed from the hopper through a guide member 10 and a chute 11 to a stopper insert station 12 where they are guided to and supported at a position immediately over the openings of successively supplied containers. The containers are successively supplied by a feed conveyor 13 to an indexing dial 14 which successively moves them to the stoppering station 12 where a vertically moveable ram 15 inserts the stoppers into the openings of the containers. The indexing dial then advances the stoppered containers to a discharge conveyor 16 as an unstoppered container is advanced to the stoppering station. The containers are guided on the conveyors 13 and 16 by guide rails 17 and 18, respectively.

The ram 15 is connected to the piston of a pneumatically driven piston-cylinder arrangement 19 for effecting vertical reciprocation of the ram.

Figure 4:
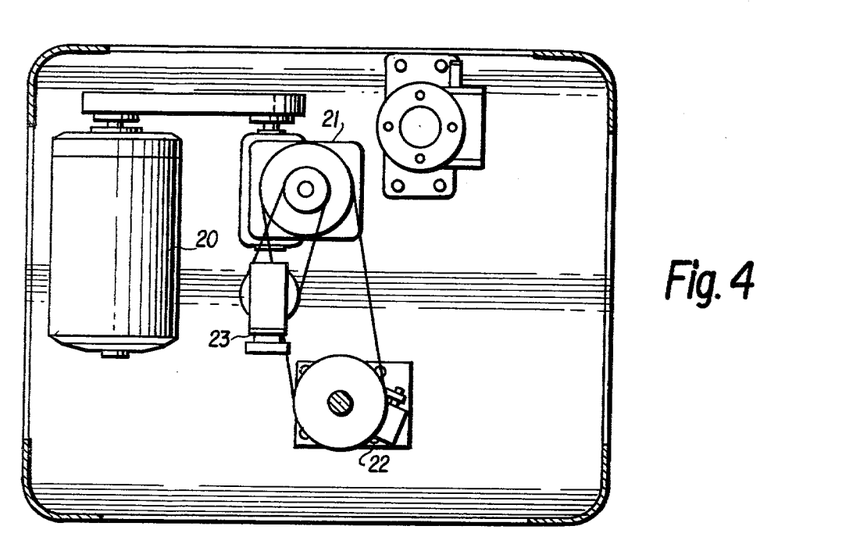
FIG. 4 is a sectional view of the stoppering machine of FIG. 3 taken along the line IV—IV.

The indexing dial 14 is incrementally rotated in the clockwise direction by a main drive motor 20 which is a D.C. electric motor, through a reducer 21 and an eight-stop index clutch 22 as shown in FIG. 4. Suitable gear belt and pulley drive connections are used between the electric motor 20 and the reducer 21, and between the reducer 21 and the indexing clutch 22. A right angle gear drive 23 is also driven by the electric motor 20 through the reducer 21. This gear drive 23 is, in turn, drivingly connected to the conveyors 13 and 16 as indicated in FIG. 3.

As shown in FIG. 3, the hopper 8 is supported by a column 24. The lower end of this column rests on a hopper elevating jack 25 so that the height of the hopper 8 above the conveyors and the indexing dial can be varied. Also, the stopper insert station 12 and the ram 15 with its piston cylinder unit 19 can be vertically adjusted with respect to the indexing dial and conveyors by means of slots 26 in the supporting bracket 27. With these vertical adjustment features, various sizes of containers or bottles can be accommodated by simply raising or lowering the aforementioned machine components to the required height.

Figure 5:
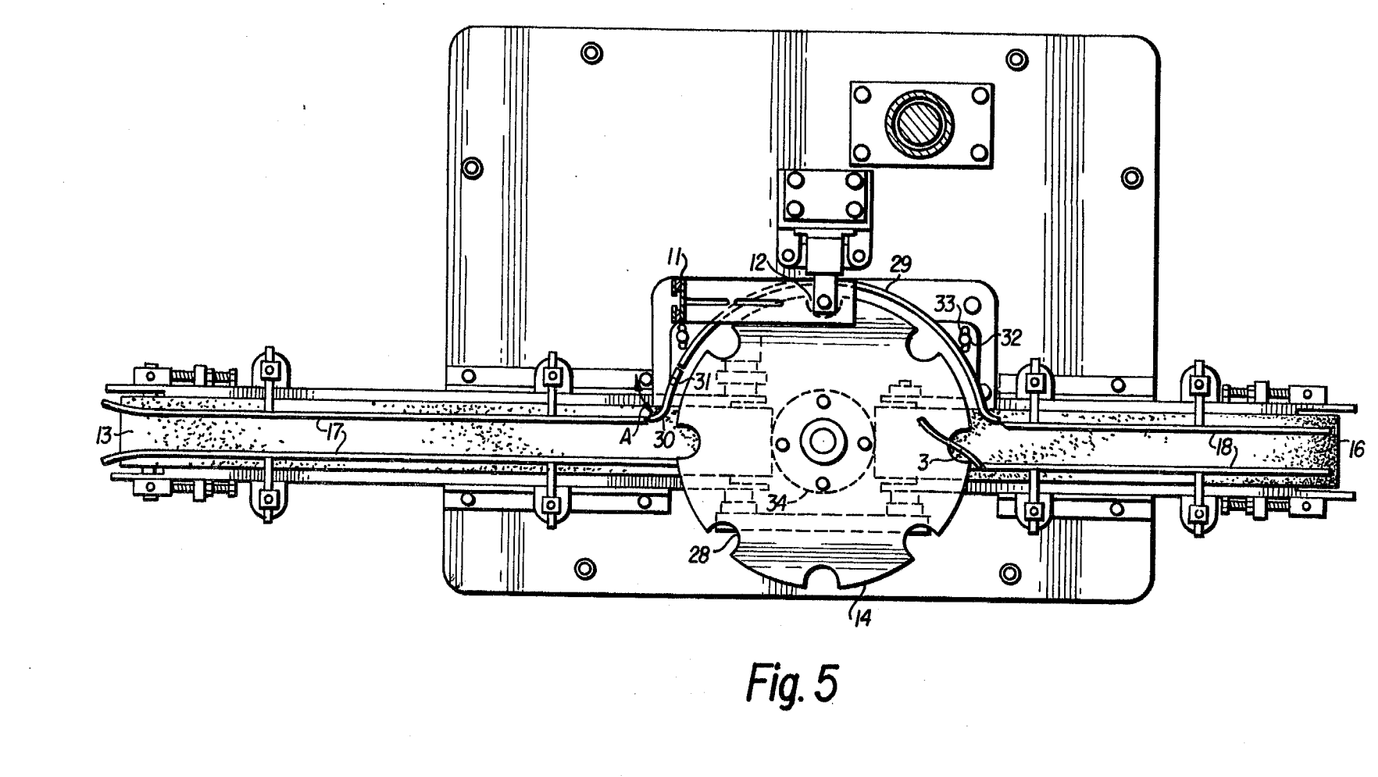
FIG. 5 is a sectional view of the stoppering machine of FIG. 3 taken along the line V—V.

The containers are incrementally moved by the indexing dial from the conveyor 13 to the stoppering station and then to the discharge conveyor 16 in eight recesses 28 spaced about the circumference of the dial as shown in FIG. 5. An index dial guide bar 29 is provided uniformly spaced from the index dial along a portion thereof to ensure that the containers remain positioned within the recesses 28 as the indexing dial rotates.

In case a container from the feed conveyor is not properly positioned within a recess of the indexing dial, upon rotation of the indexing dial the container could become wedged between the indexing dial and the guide bar causing damage to the container or the stoppering machine. To avoid this, a component 30 of the guide bar is mounted to pivot about its supporting member 31 in the direction of arrow A. Component 30 is yieldably biased in its normal position, as shown in FIG. 5, by a spring (not shown) mounted at the supporting member 31. Thus, when a container such as a bottle is not properly positioned within a recess 28, upon rotation of the indexing dial the component 30 can swing outwardly to allow the bottle to move away from the indexing dial thereby avoiding breaking of the bottle.

The guide bar 29, including its pivotable component 30, is adjustably mounted to the stoppering machine by means of fasteners 32 through the slots 33 so that various sizes of containers can be accommodated. Also, the indexing dial is removably mounted by means of fasteners 34 so that it can be replaced with dials having different sized and shaped recesses for accommodating containers having different sizes and shapes.

After the containers are stoppered at the stoppering station, they are incrementally advanced to the discharge conveyor. A deflecting member 32 is provided at the discharge conveyor to ensure that the containers move from the recesses onto the discharge conveyor. The deflecting member 32 is attached to an end of one of the guide rails 18 and extends over the indexing dial as shown in FIG. 5.

Figure 7:
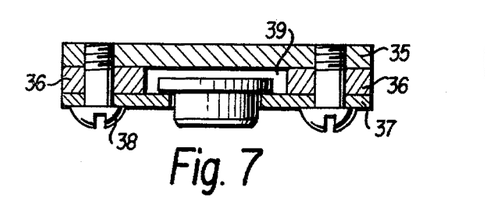
FIG. 7 is a cross sectional view of the stoppering machine chute of FIG. 6 taken along the line VII—VII.

A portion of chute 11 through which the stoppers are fed to the stopper insert station is shown in FIGS. 6 and 7. As depicted in the cross sectional view of FIG. 7, the chute is formed from a base member 35, guiding elements 36 which laterally guide or contain the stoppers, and thin retaining members 37 which permit the lower, narrower portion of the stoppers to protrude from the T-shaped chute slot 39 while retaining the wider top portion thereof. The stoppers slide down the T-shaped slot of the chute 11 under the force of gravity. Fasteners such as screws 38 are provided to join the chute components.

The lower end of the chute 11 curves to a horizontal position where it is removably fastened to the adjacent stopper insert station 12. To ensure that the stoppers move along this horizontal portion of the chute and through the stopper insert station, a means 40 may be provided for introducing a gas such as air under pressure. The gas enters the chute slot in the direction of arrow B, that is, in the direction of movement of the stoppers.

Figure 8:
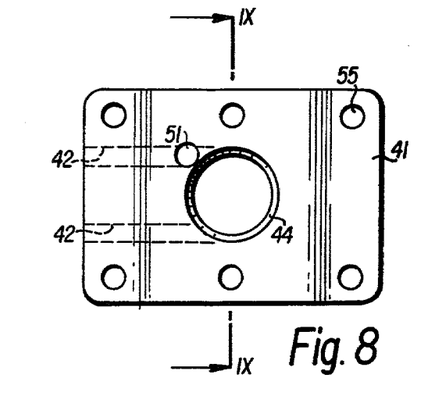
FIG. 8 is a cross sectional view of a lower portion of the stopper insert station taken along the line VIII—VIII of FIG. 6 illustrating a stopper supporting member of the stoppering station.
Figure 9:
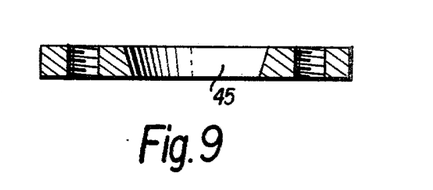
FIG. 9 is a cross sectional view of the stopper supporting member of FIG. 8 taken along the line IX—IX.
Figure 13:
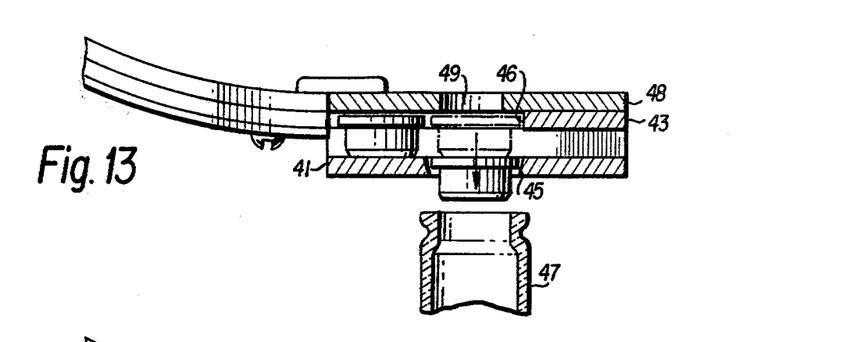
FIG. 13 is a view partly in cross section of the lower end of the chute and the stopper insert station of FIG. 6 showing several stoppers and a container having an opening to be stoppered.

The stoppers exiting the lower end of the chute 11 are supported on a supporting member 41 of the stopper insert station, see FIGS. 8, 9 and 13. If desired, supporting shims 42, shown in phantom in FIG. 8, can be provided so that the stoppers are supported under their flanges at the top portion instead of or in addition to supporting them at their lower end. These shims may be integral with the supporting member 41.

Figure 10:
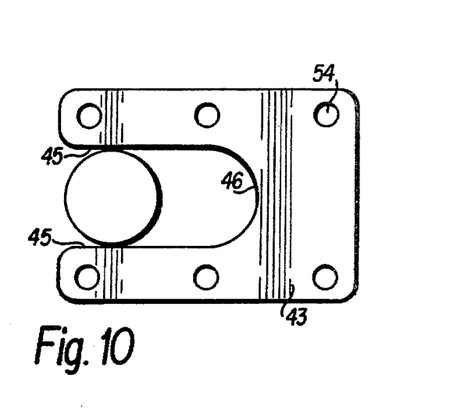
FIG. 10 is a sectional view taken along the line X—X of FIG. 6 illustrating a stopper guiding member.

The stoppers on the supporting member 41 are guided during their movement at the stopper insert station by a guiding member 43 shown in FIGS. 6, 10 and 13. The guiding member has a passageway or slot with side sails 45 which laterally contain and guide the stoppers during their movement to a position above a through hole 44 in the supporting member 41 where the stoppers drop and enter the through hole. A stopper within the passageway of guiding member 43 is shown in outline in FIG. 10. The curved end wall 46 of the passageway or slot in the guiding member 43 acts as an abutment stopping the movement of a stopper over the through hole 44. The side wall 45 of the through hole 44 tapers inwardly such that the stoppers dropping into the through hole are supported thereby in a position immediately over the openings of successively supplied containers such as bottle 47 shown in FIG. 13.

Figure 11:
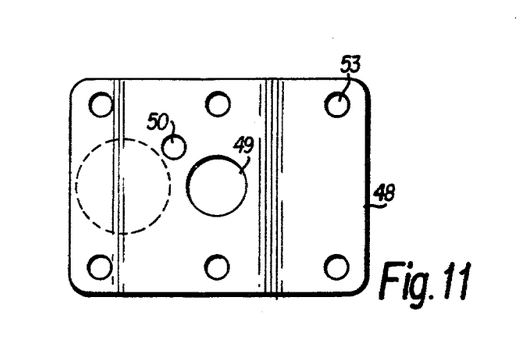
FIG. 11 is a sectional view along line XI—XI of FIG. 6 illustrating a cover member.
Figure 12:
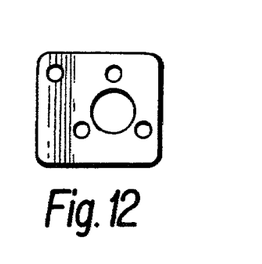
FIG. 12 is a view of the ram in FIG. 6 taken along the line XII—XII.

A cover member 48 of plexiglass, for example, is provided over the guiding member 43 for limiting the upward movement of the stoppers. As depicted in FIGS. 11 and 13, the cover member 48 is provided with holes 49 and 50. The hole 49 is provided to allow a vertically movable ram 15 to pass therethrough and to move down into the through hole 44 thereby forcing the stoppers therefrom and into the openings of the successively supplied containers positioned immediately thereunder. The hole 50 is provided in the cover member 48 to allow the movement of the pin 52 therethrough, see FIGS. 6 and 12. A corresponding opening 51 is provided in the supporting member 41 to receive the pin 52. The pin 52 moves with the ram 15 to block the movement of stoppers being guided by the guiding member 43 when the ram 15 moves down to insert the stoppers into the openings of the successively supplied containers. As a result, the stoppers are not forceably pressed against the side of the moving ram. A stopper in the blocked position is shown in phantom in FIG. 11.

Figure 14:
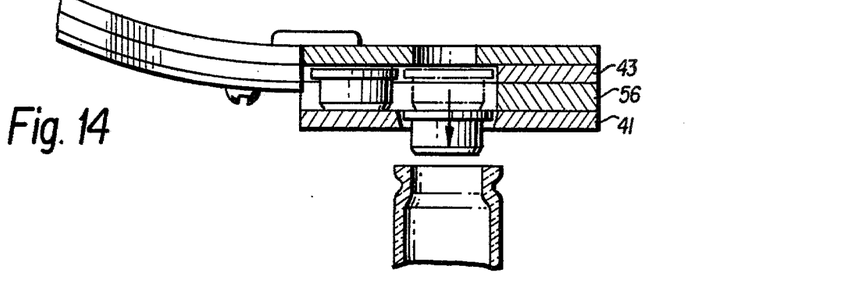
FIG. 14 is similar to FIG. 13 wherein an intermediate spacing element is provided between the supporting member and the guiding member.

The cover member 48, guiding member 43 and supporting member 41 are each provided with holes 53, 54 and 55, respectively, for suitable fastening means (not shown) which join the members to form the stopper insert station 12. Suitable spacer(s) (not shown) may be provided about the fastening means between the supporting member 41 and the guiding member 43 to ensure that the stopper passageway through the stoppering station has sufficient depth as shown in FIG. 13. Such spacers could, of course, be formed integrally with the guiding member 43 or the supporting member 41. If desired, an intermediate spacing element 56 may also be provided concentric with a portion or all of the curved end wall 46 of the guide member 43 as shown in FIG. 14 to ensure that the stoppers drop smoothly into the hole 45. Also, it is envisioned that the spacing element 56 could be integral with the supporting member 41 or the guiding member 43.

Figure 15:
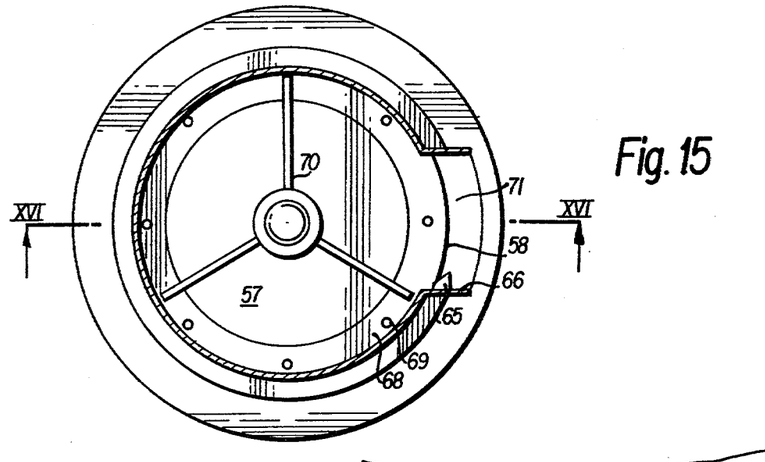
FIG. 15 is a view in the direction of arrow C in FIG. 3 into the hopper of the stoppering machine, the hopper cover having been removed.
Figures 16, 19:
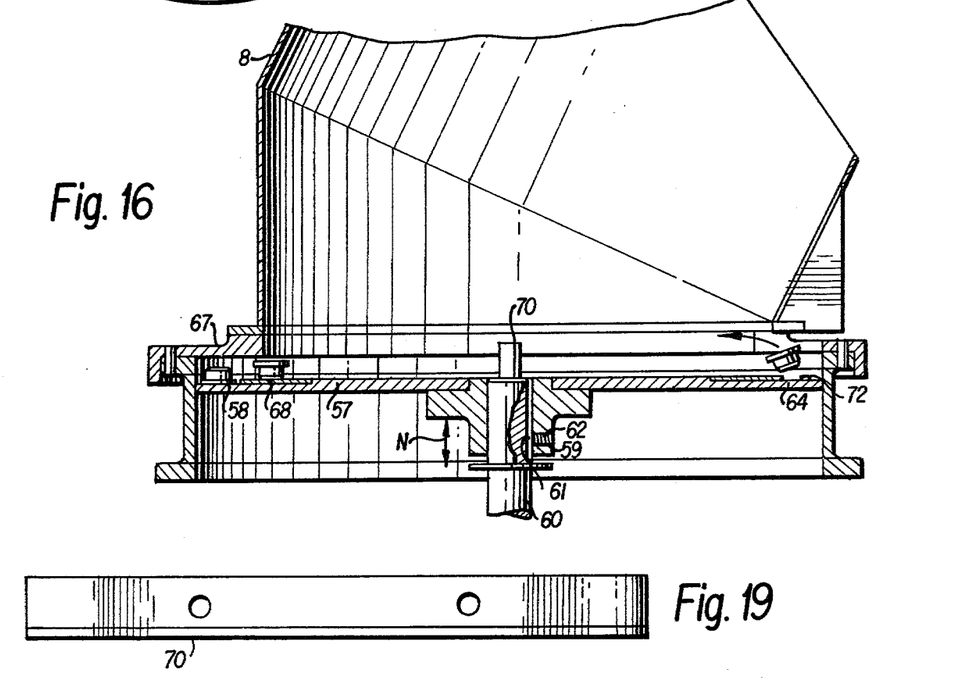
FIG. 16 is a cross sectional view of the hopper taken along the line XVI—XVI in FIG. 15.
FIG. 19 is a top view of an agitator bar for use on the inclined rotatable member of FIG. 17.

The stoppers in the hopper 8 are selectively arranged and fed through the guide member 10 and the chute 11 to the stopper insert station 12 by means of an inclined rotatable member 57 provided in a lower portion of the hopper as shown in FIGS. 15 and 16. The inclined rotatable member 57 is arranged so that it will contact a supply of stoppers placed in the hopper.

The inclined rotatable member 57 has supporting means thereon in the form of an annular recess 58 for supporting stoppers during rotation of the member 57 such that stoppers are raised to where those stoppers not properly arranged in the recess for feeding to the stopper insert station fall from the annular recess under the effect of gravity.

The rotatable member 57 is inclined at an angle of approximately 55° to the horizontal. Because of this and the configuration of the hopper 8, stoppers in the hopper tend to fall under the effect of gravity into the lower portion of the annular recess 58 of member 57.

A stationary cover member 67 is provided over a substantial portion of the annular recess 58. The cover member 67 is positioned above the recess a predetermined distance such that stoppers which are wider than they are long can only enter the recess right side up or upside down as illustrated in FIG. 16.

The inclined rotatable member 57 is secured to a hub 59 which, in turn, is mounted on one end of a shaft 60 for rotation therewith. To ensure that the hub and inclined member 57 rotate with the shaft 60, a keyway 61 is provided in the end of the shaft for cooperation with a key (not shown) carried within a threaded hole 62 in the hub 59. The shaft 60 is rotated by a drive motor 63, see FIG. 3, through a suitable drive connection such as a conventional worm gear drive.

The keyway 61 and cooperating key provide a means for adjusting the position of the hub 59 on the end of the shaft 60 in the direction of arrow D. Such adjustment changes the relative spacing between the member 57 and the stationary cover member through which the stoppers enter the recess 58. In this way, different size stoppers can be accommodated.

Figure 17:
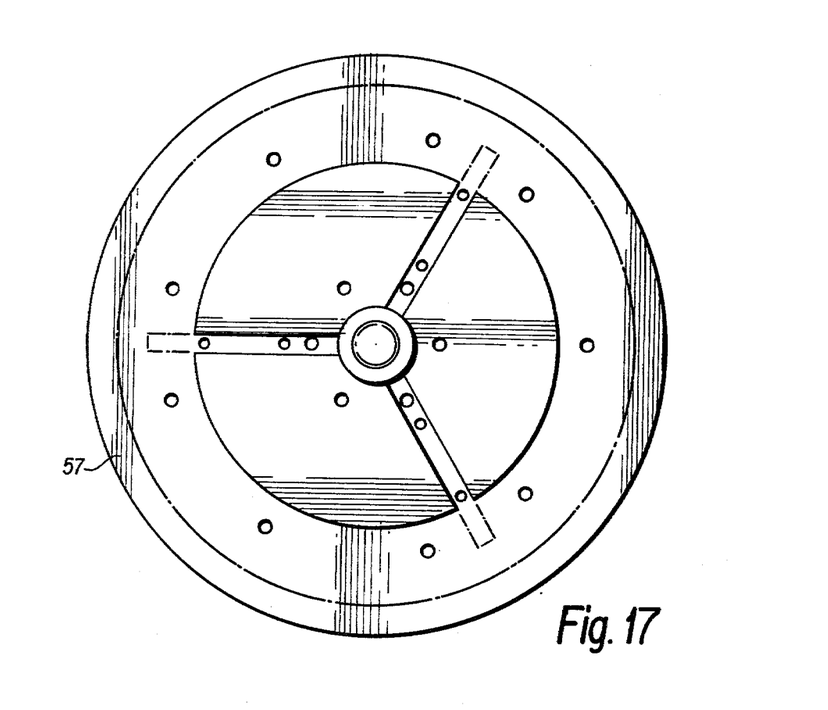
FIG. 17 is a top view of the inclined rotatable member.
Figure 18:
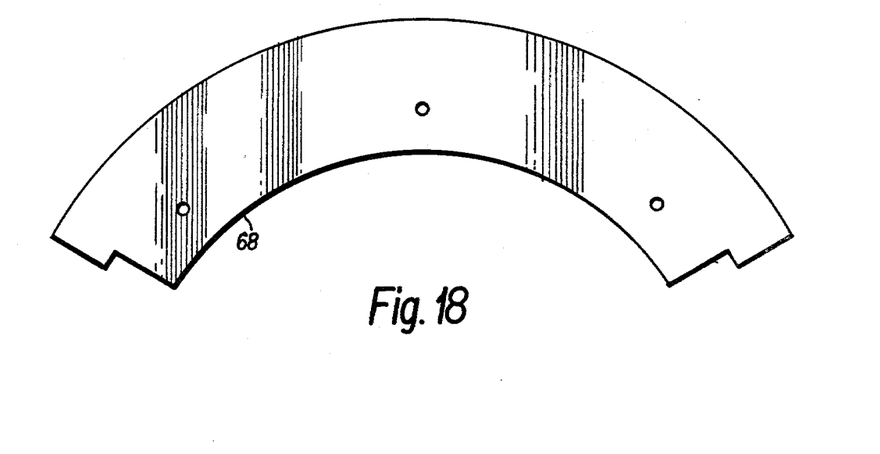
FIG. 18 is a top view of an insert which can be carried on the inclined rotatable member of FIG. 17.
Figure 20:
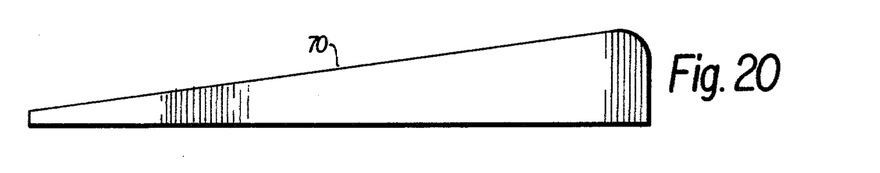
FIG. 20 is a side view of the agitator bar of FIG. 19.

Additional adjustment for different size stoppers is made possible by providing removable inserts 68 on the inclined rotatable member 57. Three such inserts are provided about the member 57 as shown in dashed lines in FIG. 17. A single insert is illustrated in FIG. 18. The inserts are removably attached to the member 57 by fasteners 69. By employing inserts with different widths and thicknesses, the width and depth of the annular recess 58 can be adjusted to accommodate different size stoppers.

Agitator bars 70 are also mounted on the inclined rotatable member 57 for rotation therewith. The bars 70 illustrated in FIGS. 15, 16, 19, 20 and 21 agitate the supply of stoppers within the hopper during rotation of the member 57 to ensure that stoppers enter the annular recess 58.

Figure 21:
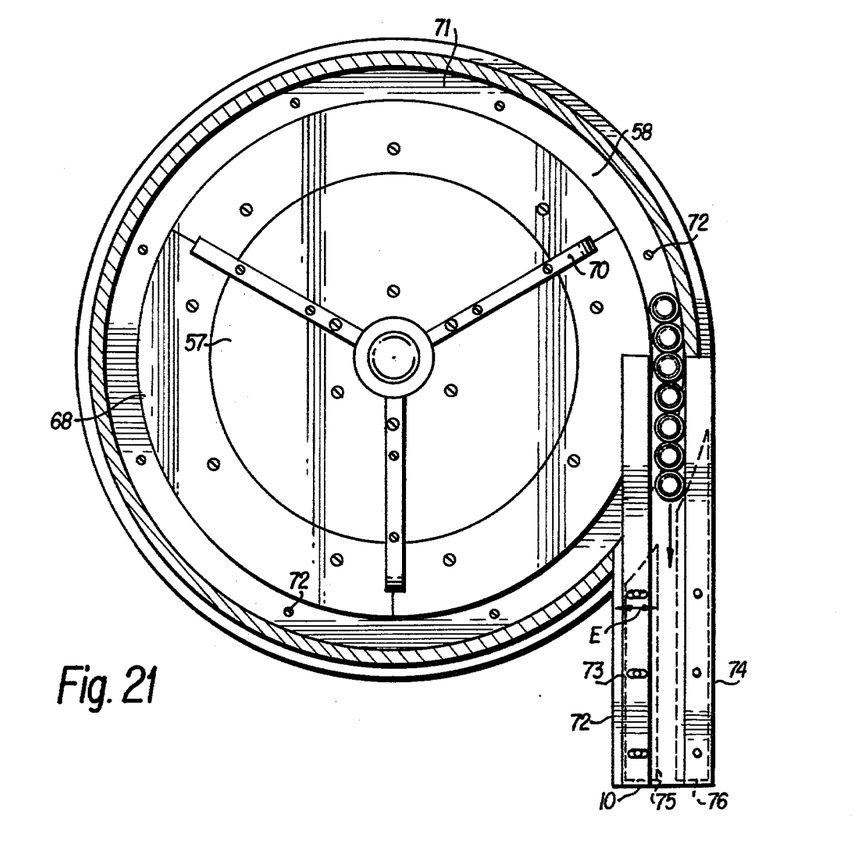
FIG. 21 is a cross sectional view of the hopper taken along the line XXI—XXI in FIG. 3.

Stoppers entering the recess 58, at the lower portion thereof, are raised during rotation of the member 57 to the higher or top portion 71 of the member 57. To prevent the stoppers from merely sliding in the recess 58 during rotation of the member 57, several pins 72 are provided in the member 57 which protrude into the recess from the bottom as depicted in FIGS. 16 and 21.

The annular recess 58 is not covered by the cover member 67 in this higher or top portion 71 of the member 57 so that stoppers not properly arranged within the recess 58 for feeding to the stopper insert station fall from the annular recess under the effect of gravity. Specifically, stoppers not positioned within the recess with their wide-flanged top portion resting relatively flat against the bottom of the recess will fall from the recess under the effect of gravity as shown in FIG. 16. This apparently occurs because of the shallowness and overall configuration of the recess and the shape and location of the center of gravity of the stoppers. On the other hand, stoppers positioned within the recess with their wide-flanged top portion resting relatively flat against the bottom of the recess 58 are retained in the recess at the uncovered top portion of the member 57 by the side wall 64 of the recess.

As an additional measure, abutments 65 and 66 are provided over the uncovered top portion 71 for knocking from the annular recess any stoppers not entirely within the recess which have not fallen under the effect of gravity.

Thus, only stoppers with their wide-flanged top portion resting relatively flat against the bottom of the recess 58 will be conveyed in the recess past the uncovered top portion 71 of the member 57. These stoppers are properly arranged for feeding to the stopper insert station. To this effect, a guiding means 10 is provided which projects into the annular recess at a location downstream along the path of rotation of the member 57 from the top portion 71 as shown in FIGS. 3 and 21 so as to guide the properly arranged stoppers from the annular recess and through the guide means to the chute 11.

The guide means 10 is formed with a base member 72 having a portion which is flush with or slightly below the bottom of the recess 58 which is complementary to a portion of the curved outer edge of the recess in member 57. Guide rails 73 and 74 of the guide means 10 are provided to guide the stoppers from the annular recess over the cover member 72. One end of the guide rail 73 actually projects into the annular recess to deflect stoppers therein into the guide means. The rail 73 can be adjusted on the base member in the direction of arrow E so as to accommodate stoppers of various widths. Cover members 75 and 76 shown in dash lines in FIG. 21 are provided over the stopper passage in the guide means 10. Stoppers actually move through the guide means to the chute 11 by gravitational force. The cover members 75 and 76 are spaced apart slightly over the stopper passageway to allow access with a prod in case the stoppers become stuck in the passageway.

Further, according to the present invention, it is contemplated that a sensing means could be provided in the guide means 10 or the chute 11 to detect when the chute and/or guide means are filled with stoppers and in response to such a condition to stop the rotation of the inclined member 57 and thus the delivery of more stoppers to the guide means.

With the previously described hopper apparatus, stoppers can be properly arranged and fed to the stopper insert station 12 at preselected rates as high as 500 per minute or more.

While I have shown and described only one embodiment in accordance with the present invention, it is understood that the same is not limited thereto but is susceptible of numerous changes and modifications as known to those skilled in the art, and I, therefore, do not wish to be limited to the details shown and described herein but intend to cover all such changes and modifications as are encompassed by the scope of the appended claims.

I claim:

1. In a stoppering machine for applying stoppers having a relatively wide flanged top portion and a relatively narrow bottom portion to the openings in containers such as bottles wherein means are provided for holding a supply of said stoppers and for selectively arranging and feeding the stoppers to a stopper inserting means where the stoppers are inserted into the openings of containers, the improvement comprising an inclined rotatable member which contacts said supply of stoppers, said rotatable member having supporting means thereon for supporting stoppers during rotation of said member such that stoppers are raised to where those stoppers not properly arranged in said supporting means for feeding to the stopper inserting means fall from said supporting means under the effect of gravity, said supporting means including an annular recess in said inclined rotatable member for supporting stoppers, and wherein cover means are provided over a substantial portion of said annular recess, said cover means extending radially inwardly to completely cover said annular recess and being positioned above said annular recess a predetermined distance such that stoppers which are wider than they are long can only enter said annular recess right side up or upside down, a portion of said annular recess at the top of the inclined rotatable member not being covered by said cover means and said annular recess being shaped such that stoppers supported in said annular recess with their top sides down remain in said annular recess as they are raised with the rotation of said inclined rotatable member while stoppers positioned otherwise in said annular recess fall from said annular recess at the uncovered top portion of the inclined rotatable member under the effect of gravity.

2. The stoppering machine according to claim 1 wherein said inclined rotatable member is provided with agitator means protruding from its surface for agitating the supply of stoppers in contact therewith to ensure that stoppers enter said supporting means thereon.

3. The stoppering machine according to claim 1 wherein said inclined rotatable member is inclined at an angle of approximately 55° to the horizontal plane.

4. The stoppering machine according to claim 1 wherein said inclined rotatable member contains removable inserts which define the width and depth of said annular recess.

5. The stoppering machine according to claim 1 wherein a guiding means is provided which projects into said annular recess so as to guide stoppers from said annular recess, said guiding means being positioned downstream along the path of rotation of said inclined rotatable member from where those stoppers not properly arranged in said annular recess fall from said annular recess under the effect of gravity.

6. The stoppering machine according to claim 5 wherein guide means guides the stoppers from said annular recess to a chute through which said stoppers move by the force of gravity to said stopper inserting means.

7. The stoppering machine according to claim 1 wherein means protrudes into said annular recess which rotates with said rotatable member to ensure that the stoppers supported in said annular recess are raised as said inclined rotatable member rotates.

8. The stoppering machine according to claim 1 wherein means are provided to adjust the spacing between said inclined rotatable member and said cover means through which the stoppers enter said annular recess.

9. The stoppering machine according to claim 1 wherein abutment means are provided over the inclined rotatable member near the top thereof and adjacent said annular recess for knocking from said annular recess any stoppers that have not fallen under the effect of gravity which are not arranged within said annular recess with their wide flanged portion resting relatively flat against the bottom of said recess.

* * * * *